United States Patent
Rahman (10) Patent No.: US 11,589,271 B2
(45) Date of Patent: *Feb. 21, 2023

(54) COMMUNICATION FALLBACK IN 5G SYSTEMS AND METHODS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,109

(22) Filed: Aug. 11, 2021

(65) Prior Publication Data

US 2021/0377819 A1 Dec. 2, 2021

Related U.S. Application Data

(63) Continuation of application No. 16/372,396, filed on Apr. 1, 2019, now Pat. No. 11,115,877.

(51) Int. Cl.
*H04W 36/00* (2009.01)
*H04W 36/30* (2009.01)
*H04W 36/26* (2009.01)

(52) U.S. Cl.
CPC ... *H04W 36/0022* (2013.01); *H04W 36/0033* (2013.01); *H04W 36/0069* (2018.08); *H04W 36/26* (2013.01); *H04W 36/305* (2018.08)

(58) Field of Classification Search
CPC .............. H04W 72/042; H04W 72/044; H04L 5/0055; H04L 5/0053; H04L 5/001
See application file for complete search history.

(56) References Cited

U.S. PATENT DOCUMENTS

| 5,963,869 A | 10/1999 | Fehnel |
| 6,738,373 B2 | 5/2004 | Turner |

(Continued)

FOREIGN PATENT DOCUMENTS

| CN | 100591175 C | 2/2010 |
| CN | 103493521 B | 2/2017 |

(Continued)

OTHER PUBLICATIONS

3rd Generation Partnership Project; Technical Specification Group Services and System Aspects; Procedures for the 5G System; Stage 2 (Release 16). 3GPP TS 23.502 V16.0.2 (Apr. 2019). Section 4.11.1.2.1 (pp. 156-160) and Section 4.13.6.1 (pp. 224-227).

(Continued)

*Primary Examiner* — Jamal Javaid
(74) *Attorney, Agent, or Firm* — Perkins Coie LLP (57) ABSTRACT

Systems and methods for performing Evolved Packet System (EPS) fallback from a 5G system to an Evolved Packet Core (EPC) system are disclosed. The method, performed in a mobile device, detects a communication at the mobile device. The method then determines whether either the mobile device or a base station supports the communication over new radio. Directly in response to determining that either one of the mobile device or the base station does not support the communication over new radio, the method generates and transmits an EPS fallback message from the mobile device to the base station, wherein the EPS fallback message instructs the base station to initiate a fallback procedure from the 5G system to the EPC system.

20 Claims, 7 Drawing Sheets

(56) References Cited

U.S. PATENT DOCUMENTS

| | | |
|---|---|---|
| 7,079,521 B2 | 7/2006 | Holur et al. |
| 7,260,087 B2 | 8/2007 | Bao et al. |
| 7,280,546 B1 | 10/2007 | Sharma et al. |
| 7,330,453 B1 | 2/2008 | Borella et al. |
| 7,940,730 B1 | 5/2011 | Mahler et al. |
| 8,130,635 B2 | 3/2012 | Suvi et al. |
| 8,817,600 B2 | 8/2014 | Payyappilly et al. |
| 8,855,083 B2 | 10/2014 | Aghvami et al. |
| 8,903,393 B2 | 12/2014 | Payyappilly et al. |
| 8,982,840 B2 | 3/2015 | Zisimopoulos et al. |
| 9,143,548 B2 | 9/2015 | Foti |
| 9,271,255 B1 | 2/2016 | Jones |
| 9,401,934 B2 | 7/2016 | Sylvain |
| 9,763,148 B2 | 9/2017 | Wong et al. |
| 9,807,819 B1 | 10/2017 | Zhu et al. |
| 9,872,216 B2 | 1/2018 | Aghvami et al. |
| 9,961,591 B2 | 5/2018 | Swaminathan |
| 10,595,250 B2 | 3/2020 | Keller et al. |
| 10,764,957 B2 | 9/2020 | Jha et al. |
| 11,115,877 B2 * | 9/2021 | Rahman ............... H04W 36/305 |
| 11,310,700 B2 | 4/2022 | Kwok et al. |
| 2005/0249196 A1 | 11/2005 | Ansari et al. |
| 2006/0291412 A1 | 12/2006 | Naqvi et al. |
| 2007/0078986 A1 | 4/2007 | Ethier et al. |
| 2007/0140218 A1 | 6/2007 | Nair et al. |
| 2007/0243872 A1 | 10/2007 | Gallagher et al. |
| 2009/0168766 A1 | 7/2009 | Eyuboglu et al. |
| 2011/0039562 A1 | 2/2011 | Balasubramanian et al. |
| 2011/0122783 A1 | 5/2011 | Lin et al. |
| 2012/0224564 A1 | 9/2012 | Paisal et al. |
| 2013/0094446 A1 | 4/2013 | Swaminathan |
| 2013/0142169 A1 | 6/2013 | Kulakov et al. |
| 2014/0064156 A1 | 3/2014 | Paladugu et al. |
| 2014/0328217 A1 | 11/2014 | Bollapragada et al. |
| 2017/0026938 A1 | 1/2017 | Onggosanusi et al. |
| 2018/0092085 A1 | 3/2018 | Shaheen et al. |
| 2019/0053028 A1 | 2/2019 | Chandramouli et al. |
| 2019/0174011 A1 | 6/2019 | Jabara et al. |
| 2020/0015128 A1 | 1/2020 | Stojanovski et al. |
| 2020/0022031 A1 | 1/2020 | Li et al. |
| 2020/0068647 A1 | 2/2020 | Jha et al. |
| 2020/0112887 A1 | 4/2020 | Kwok et al. |
| 2022/0345949 A1 | 10/2022 | Youn et al. |

FOREIGN PATENT DOCUMENTS

| | | |
|---|---|---|
| CN | 104038974 B | 3/2017 |
| CN | 104081741 B | 4/2018 |
| CN | 104335544 B | 5/2018 |
| CN | 103997485 B | 6/2018 |
| CN | 107466114 B | 6/2020 |
| CN | 106797594 B | 7/2020 |
| CN | 109548093 B | 2/2021 |
| DE | 10297190 B4 | 12/2011 |
| EP | 1670273 A1 | 6/2006 |
| EP | 1980070 B1 | 5/2014 |
| EP | 1880559 B1 | 8/2015 |
| EP | 1751923 B1 | 5/2017 |
| EP | 2314103 B1 | 3/2018 |
| EP | 1973368 B1 | 9/2018 |
| EP | 2689578 B1 | 1/2019 |
| EP | 3780757 A1 | 2/2021 |
| JP | 4921551 B2 | 2/2012 |
| JP | 5119243 B2 | 10/2012 |
| KR | 100954616 B1 | 4/2010 |
| KR | 101148036 B1 | 6/2012 |
| KR | 101163258 B1 | 7/2012 |
| KR | 101565626 B1 | 11/2015 |
| WO | 9916266 A1 | 4/1999 |
| WO | 2005064962 A1 | 7/2005 |
| WO | 2006040673 A2 | 4/2006 |
| WO | 2007140834 A1 | 12/2007 |
| WO | 2009006079 A1 | 1/2009 |
| WO | 2011056046 A2 | 5/2011 |
| WO | 2015003153 A1 | 1/2015 |
| WO | 2017176071 A1 | 10/2017 |
| WO | 2018230603 A1 | 12/2018 |
| WO | 2021049841 A1 | 3/2021 |

OTHER PUBLICATIONS

Ericsson et al. "EPS Fallback for voice further enhancements" S2-181692, 3GPP TSG-SA WG2 Meeting #126, Montreal, Canada. Feb. 20, 2018, 10 pages.

Ericsson et al. "EPS Fallback for voice" S2-181636, 3GPP TSG-SA WG2 Meeting #126, Montreal, Canada. Mar. 13, 2018, 2 pages.

Ericsson et al. "EPS Fallback for voice" S2-181637, 3GPP TSG-SA WG2 Meeting #126, Montreal, Canada. Feb. 20, 2018, 10 pages.

International Searching Authority, International Search Report and Written Opinion, PCT Patent Application PCT/US2020/026265, dated Jul. 17, 2020, 10 pages.

ZTE. "Clarification and alignment on the NG-RAN behavior for EPS/RAT fallback," S2-181829, 3GPP TSG-SA WG2 Meeting #126, Montreal, Canada, Feb. 20, 2018, 2 pages.

3rd Generation Partnership Project; Technical Specification Group Services and System Aspects; Procedures for the 5G System; Stage 2 (Release 17). 3GPP TS 23.502 V17.1.0, Jun. 24, 2021. Section 4.11.1.3.1, 4.13.6.1-4.13.6.2; and figure 4.13.6.1-1, 692 pages.

International Searching Authority, International Search Report and Written Opinion, PCT Patent Application PCT/US2022/038085, dated Nov. 1, 2022, 11 pages.

* cited by examiner

| Node Identifier 505 | Location 510 | Protocol Supported 515 | Frequencies (GHz) 520 | Start date-time 525 | End date-time 530 |
|---|---|---|---|---|---|
| 200567 | US-NE | 3G | UL 746-763 DL 776-793 | Jan. 1, 2012 00:01:00 hrs | Dec. 31, 2025 12:00:00 hrs |
| 200567 | US-NE | 4G | UL 746-763 DL 776-793 | Jan. 1, 2012 00:01:00 hrs | |
| 301754 | EU | 5G | UL 1850-1910 DL 1930-1990 | Apr. 1, 2020 03:00:00 hrs | |
| ... | | | | | |

COMMUNICATION FALLBACK IN 5G SYSTEMS AND METHODS

CROSS-REFERENCE TO RELATED APPLICATION

This application is a continuation of U.S. patent application Ser. No. 16/372,396, filed Apr. 1, 2019, entitled COMMUNICATION FALLBACK IN 5G SYSTEMS AND METHODS, which is hereby incorporated by reference in its entirety.

BACKGROUND

5G New Radio (NR) is expected to coexist with 4G Long Term Evolution (LTE) both during the initial deployment phase (providing a seamless transition from 4G LTE to 5G NR) and even later when 5G is widely deployed. For example, heterogenous networks (HetNets) providing for E-UTRAN-NR Dual Connectivity (EN-DC) will exist to provide, for example, better in-building connectivity and indoor coverage using user equipment or terminal equipment simultaneously connected to 5G small cell devices and 4G macro base stations or vice-versa. Multiple migration paths and steps exist for migration to 5G. For instance, an initial 5G deployment using option 3-5G Evolved Packet System (EPS) includes NR non-standalone in the Radio Access Network (RAN). 4G voice (VoLTE) and other IP Multimedia System (IMS) services continue to be used without the need for any core network upgrade. At least initially, a 5G system will not be deployed with full network coverage. Therefore, the 5G system will need to be tightly coupled to an existing 4G VoLTE deployment to provide seamless voice services across the whole 4G+5G network.

To accommodate 5G systems using option 2 (3GPP-option 2), the 3rd Generation Partnership Project (3GPP) has published an EPS fallback procedure. The EPS fallback procedure enables phones to use the 5G system with NR before all needed voice features are implemented in a mobile device and in NG-RAN. This is an intermediate step toward supporting in a 5G system voice or other communication, such as video, text, and so on. A mobile device (user device, UE) that tries to establish a voice communication via a NR node will perform an EPS fallback at call setup, triggered by an attempt to establish a Quality-of-Service (QoS) bearer for the voice flow for voice over NT (VoNR). When attempting to establish the QoS bearer for the voice flow over NR during call set-up, the NG-RAN can reject the QoS flow setup towards the 5G system and provide an indication that mobility is in progress. The NG-RAN can then initiate transfer of all sessions from the 5G system to EPS, using either a release with redirect procedure or an inter-system handover procedure. However, the EPS fallback procedure adds significant call setup time, which should be kept as short as possible.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Currently, under the 3GPP guidelines, the process to setup a call from a 5G user device (UE) that does not support Voice over New radio (VoNR) takes a long time (e.g., more than 10-12 seconds) and is performed via a set of complex and time-consuming steps. In particular, as per the current 3GPP guidelines, a 5G UE will not invoke the EPS fallback procedure immediately when a user initiates a communication (for example, dials a call). Instead, the 5G UE will first perform multiple signaling steps (costing time and resources) to try to connect to the IMS network via a 5G New Radio (5G NR) before eventually triggering the EPS fallback procedure. Thus, the current process will result in a significant delay in call setup time.

Once telecommunications service providers and UEs start adopting 5G, this long call setup time will result in degraded customer experience. To solve this problem, modified call setup methods and systems that reduce the call setup time in such circumstances are described herein. In particular, a 5G UE that does not support VoNR (3GPP-option 2) will automatically fallback to an LTE radio without first executing multiple signaling steps to try to connect to the IMS network via a 5G NR. Logic in the 5G UE will be enhanced such that when a UE initiates communications (for example, when a user dials a call), instead of immediately sending a SIP INVITE from the 5G UE to the IMS network (via the 5G NR), the 5G UE will automatically trigger the EPS fallback procedure to fallback to LTE by performing reselection to available LTE cell sites. Once the 5G UE has latched onto an LTE cell site, the 5G UE will send a SIP INVITE to the connected LTE cell site and re-establish IMS registration using the LTE cell site (existing VoLTE call flow).

In the following description, for the purposes of explanation, numerous specific details are set forth in order to provide a thorough understanding of implementations of the present technology. It will be apparent, however, to one skilled in the art that implementations of the present technology can be practiced without some of these specific details. Further, while the following description discusses voice communication (for example, VoLTE, VoNR, and so on), it will be apparent to one skilled in the art that implementations of the present technology can be practiced for other types of communications as well (for example, video, text, and so on).

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Figure 1:
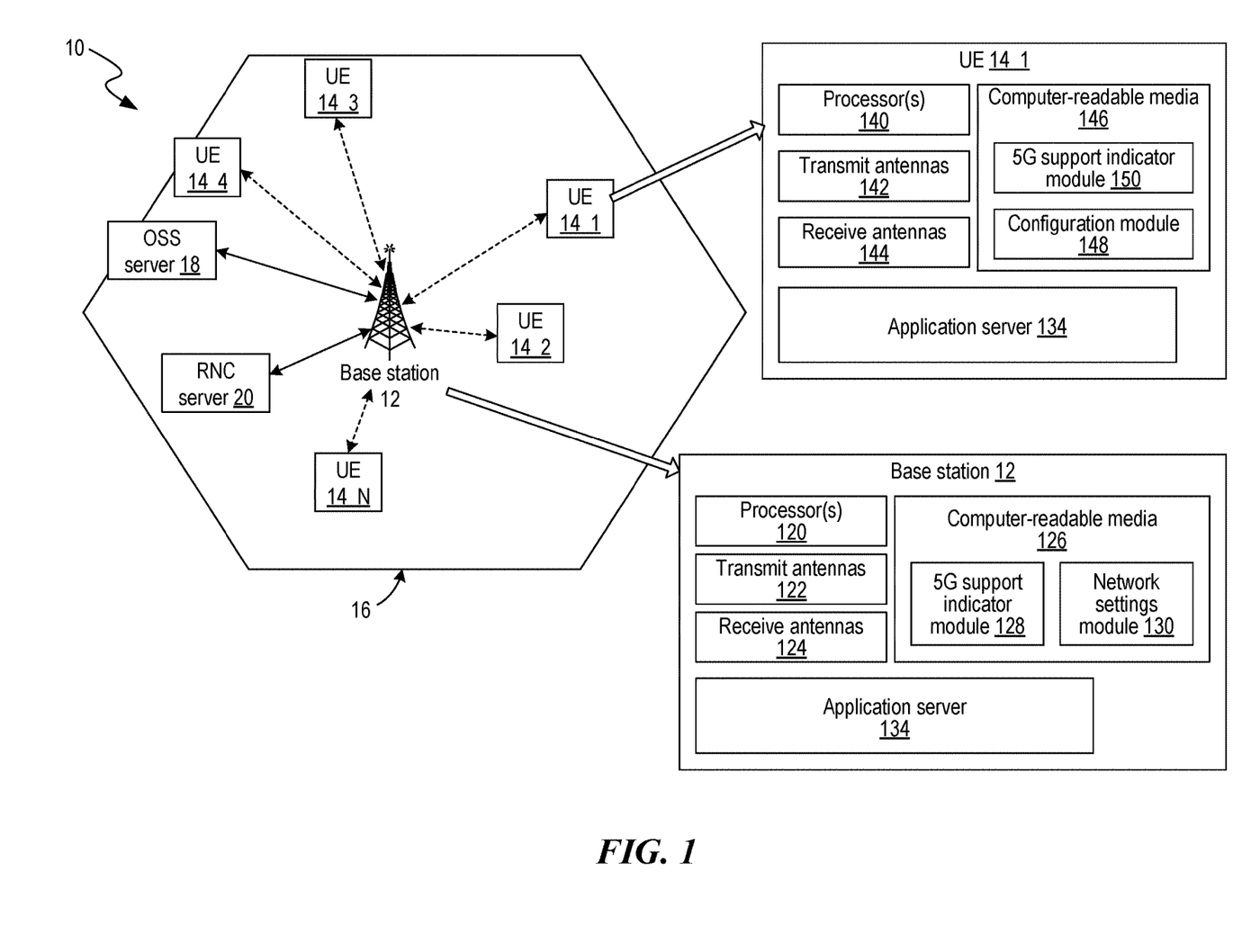
FIG. 1 illustrates a communication network in which some implementations of the present technology can be utilized.

FIG. 1 illustrates a telecommunications network 10 (also referred to herein as network 10) in accordance with various implementations or embodiments. The network 10 comprises a base station (BS) 12 communicatively coupled to multiple user devices, referred to as user equipment (UE) UEs 14_1, 14_2, . . . , 14_N, where N is an integer. The BS 12 serves UEs 14 located within a geographical area, for example, within a macro cell 16. FIG. 1 illustrates the macro cell 16 to be hexagonal in shape, though this is merely a schematic representation. In general, the network 10 comprises multiple cells 16, with each cell 16 including one or more BSs 12 (macro cell), 5G transceivers (small cell devices), or a combination of both macro and small cells (HetNets), though many other cell types are possible including cells having one or more femtocells, picocells, IEEE 802.11 access points (WiFi APs). (While FIG. 1 shows a macro cell, the cell 16 need not be so limited, and the term "base station" as used herein likewise encompasses any device to provide a wireless connection between UEs and a larger wired network.) Depending on the configuration and size, the network 10 can represent and serve various regional areas, for example, a city, a state, an entire nation, the whole world, etc.

The UEs 14_1, . . . , 14_N comprise any devices for communicating over a wireless communication network. Such devices include mobile telephones, cellular telephones, mobile computers, Personal Digital Assistants (PDAs), radio frequency devices, handheld computers, laptop computers, tablet computers, server computers, client computers, personal computers (PCs), tablet PCs, set-top boxes ("STBs"), palmtops, pagers, integrated devices combining one or more of the preceding devices, or any machine capable of executing a set of instructions (sequential or otherwise) that specify actions to be taken by that machine. As such, UEs 14_1, . . . , 14_N can range widely in terms of capabilities and features. UEs 14_1, . . . , 14_N can include a universal integrated circuit card (UICC) with, e.g. a subscriber identity module ("SIM")), but alternatively or additionally can include SIM-less devices (i.e., mobile devices that do not contain a functional SIM), embedded SIM devices (for example, eSIM and/or iSIM devices), roaming mobile devices (i.e., mobile devices operating outside of their home access networks), and/or mobile software applications.

In some implementations, the BS 12 communicates voice traffic and/or data traffic with one or more of the UEs 14_1, . . . , 14_N. The BS 12 can communicate with the UEs 14_1, . . . , 14_N using one or more communication protocols or standards. For example, the BS 12 communicates with the UEs 14_1, . . . , 14_N using one or more standards/protocols, including but not limited to Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), or other communications networks.

The BS 12 can be communicatively coupled (for example, using a backhaul connection, illustrated using solid lines in FIG. 1) to backhaul equipment, for example, an operation support subsystem (OSS) server 18, a radio network controller (RNC) 20, etc. The RNC 20 can also be in the form of or include a mobility management entity (MME) when the wireless communication network 10 operates according to the long term evolution (LTE) standard or LTE Advanced standard, be in the form of or include an access and management mobility function (AMF) when the wireless communication network 10 operates according to the 5G standard, or both.

As shown in the block diagram, the base station 12 comprises processors 120, one or more transmit antennas (transmitters) 122, one or more receive antennas (receivers) 124, and computer-readable media 126. The processors 120 are configured to execute instructions, which can be stored in the computer-readable media 126 or in other computer-readable media accessible to the processors 120. The processors 120 can be a central processing unit (CPU), a graphics processing unit (GPU), or both CPU and GPU, or any other sort of processing unit. In 3GPP RANs in LTE systems, the base station 12 can include a RAN Node such as an Evolved-Universal Terrestrial Radio Access Network (E-UTRAN) Node B (also commonly denoted an eNode B, or eNB) and/or RNC in an E-UTRAN, which communicates with user devices, such as UEs 14_1, . . . , 14_N. In 5G wireless RANs, RAN Nodes can include a 5G Node, new radio (NR) or g Node B (gNB).

The one or more transmit antennas 122 transmit signals to the UEs 14_1, . . . , 14_N, and the one or more receive antennas 124 receive signals from the UEs 14_1, . . . , 14_N. The antennas 122 and 124 include antennas known in the art. For example, antennas 122 and 124 include radio transmitters and radio receivers that perform the function of transmitting and receiving radio frequency communications. The antennas 122 and 124 can be included in a transceiver module of the BS 12.

The computer-readable media 126 includes computer-readable storage media ("CRSM"). The CRSM can be any available physical media accessible by a computing device to implement the instructions stored thereon. CRSM can include, but is not limited to, random-access memory ("RAM"), read-only memory ("ROM"), electrically erasable programmable read-only memory ("EEPROM"), flash memory or other memory technology, compact disc read-only memory ("CD-ROM"), digital versatile discs ("DVD") or other optical disc storage, magnetic cassettes, magnetic tape, magnetic disk storage or other magnetic storage devices, or any other medium which can be used to store the desired information and which can be accessed by the base station 12. The computer-readable media 126 can reside within the base station 12, on one or more storage devices accessible on a local network to the base station 12, on cloud storage accessible via a wide area network to the base station 12, or in any other location. The computer-readable media 126 stores modules, such as instructions, data stores, and so forth that are configured to execute on the processors 120.

For instance, the computer-readable media 126 stores a 5G support indicator module 128 and a network settings module 130. The 5G support indicator module 128 in base station 12 stores information about: whether base station 12 supports communication under 5G systems with NR (for example, Voice over NR-VoNR), whether a connected UE (for example, UE 14) supports communication under VoNR, whether a connected network supports communication under VoNR, whether one or more associated base stations support communication under VoNR, and so on. In some embodiments, the 5G support indicator module 128 stores a validity timeframe with one or more indicators of 5G VoNR communication support for networks, base stations, UEs, and so on. For example, the 5G support indicator module 128 may store information about a first UE UE14_1 supporting 5G VoNR communication from Aug. 1, 2019 onwards, store information about a second UE UE14_2 supporting 5G VoNR communication from Apr. 1, 2019 onwards, and store information about a third UE UE14_3 supporting 5G VoNR communication only from Nov. 1, 2019 to Dec. 31, 2020 (for example, for testing purposes). In some embodiments, base station 12 retrieves information about whether (and/or for what time period), a UE supports VoNR from a telecommunications service provider to which the UE is connected (for example, by querying a Home Subscriber Service (HSS)).

Although FIG. 1 illustrates the computer-readable media 126 in the BS 12 storing the 5G support indicator module 128, the network settings module 130, and/or one or more other modules (not illustrated), these modules can be stored in another component of the network 10 (for example, other than the BS 12). For example, one or more of these modules can be stored in a computer-readable media included in the OSS server 18, the RNC 20, another server associated with the network 10, and so on.

As shown in the block diagram of FIG. 1, the UEs 14_1 comprises processors 140, one or more transmit antennas (transmitters) 142, one or more receive antennas (receivers) 144, and computer-readable media 146. The processors 140 are configured to execute instructions, which are stored in the computer-readable media 146 or in other computer-readable media accessible to the processors 140. In some implementations, the processor 140 is a central processing unit (CPU), a graphics processing unit (GPU), or both CPU and GPU, or any other sort of processing unit. The one or more transmit antennas 142 transmit signals to the base station 12, and the one or more receive antennas 144 receive signals from the base station 12. The antennas 142 and 144 can be included in a transceiver module of the UE 14.

The computer-readable media 146 stores several modules, such as instructions, data stores, and so forth that are configured to execute on the processors 140. For instance, the computer-readable media 146 stores a configuration module 148 and a 5G support indicator module 150. The 5G support indicator module 150 in UE 14 stores information about whether UE 14 supports communication under VoNR, whether a connected network supports communication under VoNR, whether one or more associated base stations support communication under VoNR, and so on. The 5G support indicator module 150 can store and classify this information based on a type of communication (for example, non-emergency voice, emergency voice, non-emergency text, emergency text, video, and so on), location of mobile device, and so on.

Figure 5:
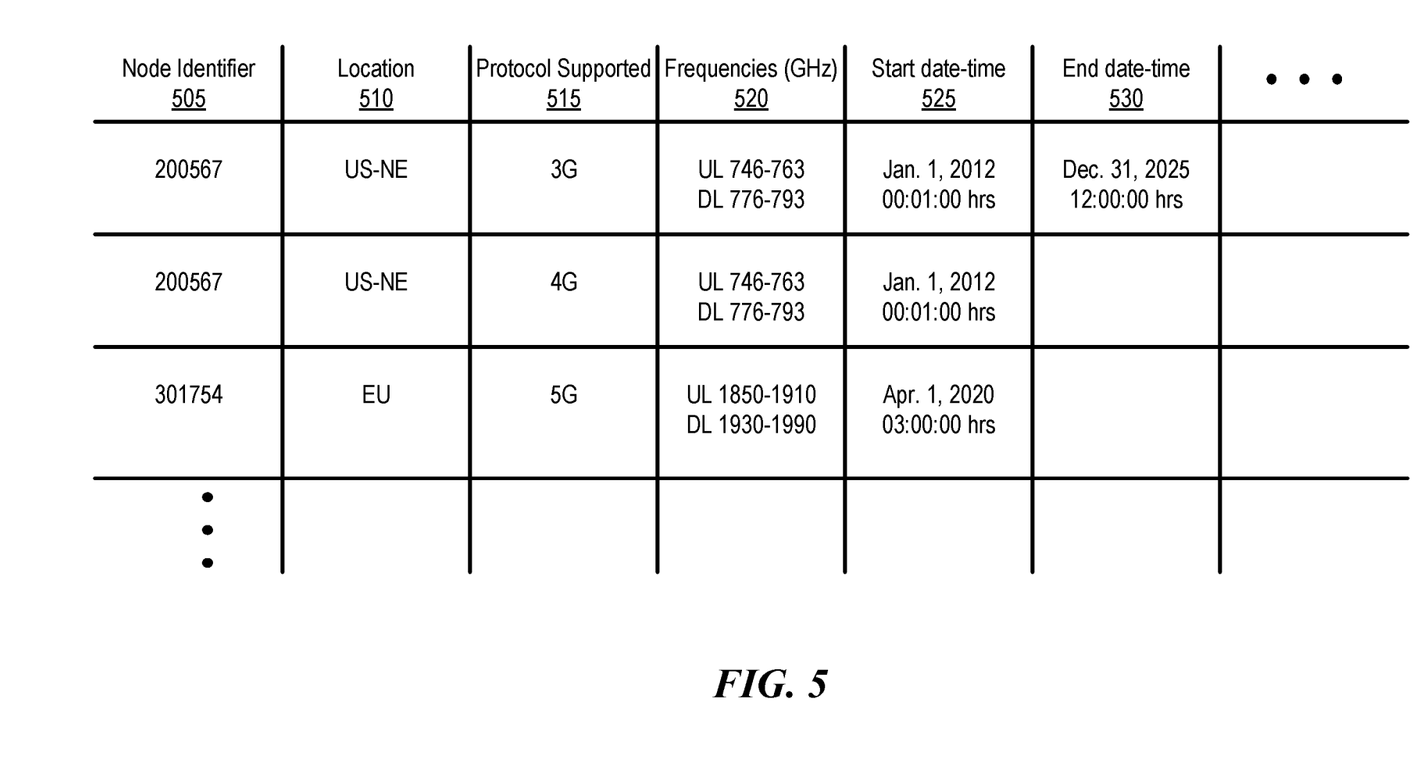
FIG. 5 illustrates an example data structure to store information at a mobile device about various protocols supported by base stations according to various implementations.

In some embodiments, the 5G support indicator module 150 stores a validity timeframe with one or more indicators of 5G VoNR communication support for networks, base stations, and so on. For example, the 5G support indicator module 150 may store information about a first telecommunications network supporting 5G VoNR communication from Jan. 1, 2019, onwards, store information about a second telecommunications network supporting 5G VoNR communication from Jul. 10, 2019 onwards, and store information about a third telecommunications network supporting 5G VoNR communication only from May 1, 2019 to Dec. 31, 2019 (for example, for testing purposes). FIG. 5 illustrates an example data structure 500 maintained by the 5G support indicator module 150 to store information about various protocols supported by base stations according to various implementations. As illustrated in FIG. 5, data structure 500 stores the following information: node identifiers (for example, base station identifier codes (BSIC)) 505, locations 510 (e.g. Northeast US, Europe), supported protocols 515 (3G, 4G, 5G, etc.), supported frequencies 520, validity start date-time 525, validity end date-time 530, and so on.

In some embodiments, information stored in the 5G support indicator module 150 (for example, values in data structure 500) is initially setup by an Original Equipment Manufacturer (OEM) when the UE is manufactured and/or before it is distributed to a subscriber. For example, an OEM can set-up initial values for whether base stations associated with a telecommunications service provider support VoNR and their associated validity timeframes. Information stored in the 5G support indicator module 150 can be periodically updated by an OEM, subscribed telecommunications service providers, connected base stations, UE subscriber, and so on. For example, when a subscribed telecommunications service provider can fully support VoNR, it can send an update to UE 14_1 (for example, via Non-Access Stratum (NAS) layer messages) to update the corresponding information in the 5G support indicator module 150 of UE 14_1 to indicate that the subscribed telecommunications service provider now fully supports VoNR (and as such, the EPS fallback procedure does not need to be invoked to complete a 5G VoNR call).

Although not illustrated in FIG. 1, the computer-readable media 146 can also store one or more applications configured to receive and/or provide voice, data and messages (for example, short message service (SMS) messages, multimedia message service (MMS) messages, instant messaging (IM) messages, enhanced message service (EMS) messages, etc.) to and/or from another device or component (for example, the base station 12, other UEs, etc.). Although not illustrated in FIG. 1, the UEs 14 can also comprise various other components, for example, a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, . . . , 14_N can have a structure that is at least in part similar to that of the UE 14_1. For example, similar to the UE 14_1, each of the UEs 14_2, . . . , 14_N comprise processors, one or more transmit antennas, one or more receive antennas, and computer-readable media including a configuration module.

The network settings module 130 of BS 12, stored in the computer-readable media 126, maintains one or more network settings associated with the network 10. Individual network settings maintained by the network settings module 130 can be pertinent to a single UE of the UEs 14_1, . . . , 14_N, a subset of the UEs 14_1, . . . , 14_N, or each of the UEs 14_1, . . . , 14_N. For example, a network setting of the one or more network settings can specify a maximum bit rate at which each of the UEs 14_1, . . . , 14_N can transmit data to the BS 12. Another network setting of one or more network settings can specify a transmit time interval (tti) used by each of the UEs 14_1, . . . , 14_N to transmit data to the BS 12. Yet another network setting can specify a maximum power that each of the UEs 14_1, . . . , 14_N can use to transmit data to the BS 12. One or more network settings maintained by the network settings module 130 can also include any other type of network settings.

One or more of the network settings maintained by the network settings module 130 can be communicated to the UEs 14_1, . . . , 14_N (for example, by the transmit antennas 122 to the receive antennas 144 of the UEs 14_1, . . . , 14_N). Based on receiving the network settings, the UEs 14_1, . . . , 14_N (for example, the corresponding configuration modules 148) configure themselves and communicate with the BS 12. The application server can also be located within the OSS server 18 or the RNC 20, or be located outside the network 10. The network 10 can include multiple application servers 134.

The UEs 14 generally access or connect to the network 10 by a registration process. Likewise, the UEs 14 exit the network 10 by a de-registration process. While UEs 14 are registered with the network 10, they communicate with the base station 12 by sending and/or receiving messages, feedback and commands. Examples of messages and commands include, but are not limited to the following: power-up, power-down, quality of service, data speed request, resource request, bandwidth request, call type origination, service type, power headroom report, radio bearer, handover. The UEs 14 and/or the base station 12 can perform one or more actions upon receiving a message. Examples of actions include, but are not limited to, increasing transmit power, decreasing transmit power, allocating resources, changing the format of transmission, and so on.

Figure 2:
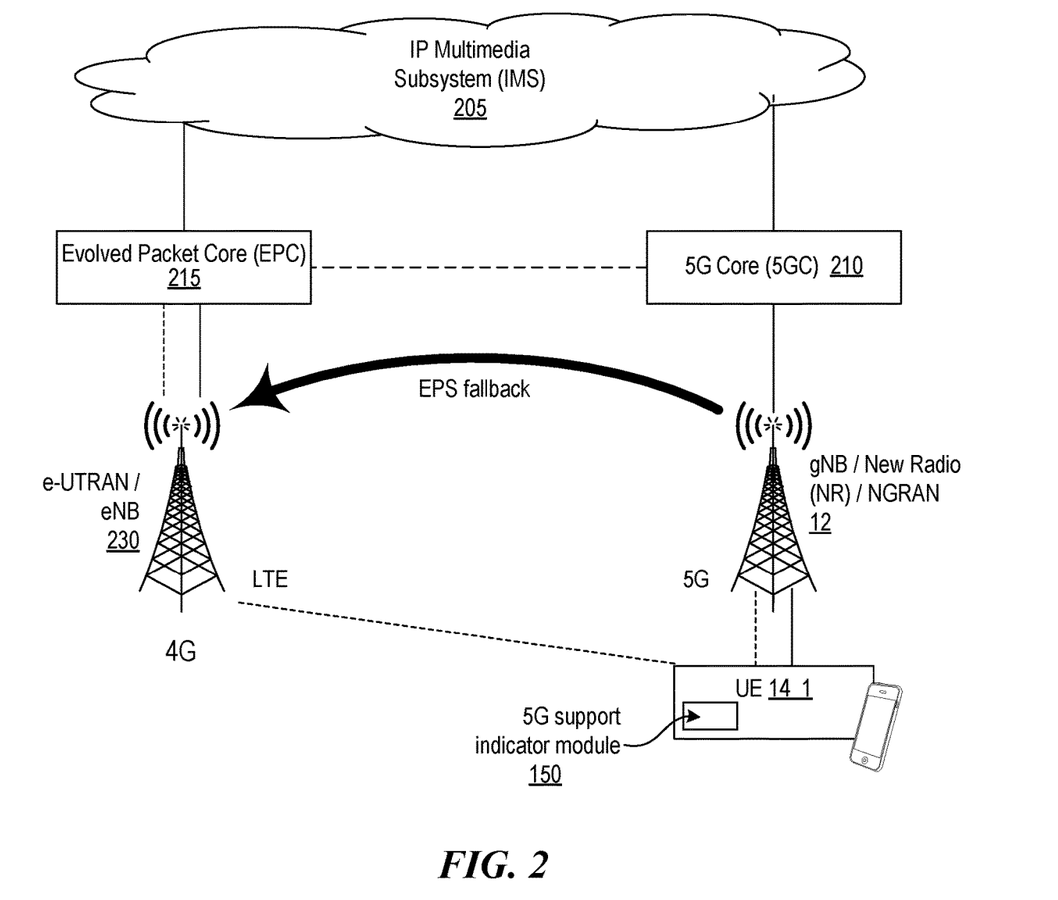
FIG. 2 is a flow diagram illustrating a set of operations for performing EPS fallback according to various implementations.

FIG. 2 is a flow diagram illustrating an overall process flow for performing EPS fallback according to various implementations. UE 14_1 is communicatively coupled to a 5G node (gNB, NR, NGRAN, and so on) 12. The 5G node or BS 12 is communicatively coupled to the 5G system (5G Core) 210, which is supported by IMS 205. As illustrated in FIG. 2, when UE 14_1 determines that either the UE 14_1 itself, or the connected 5G node 12, does not support communication over the 5G system (for example, does not support VoNR), UE 14_1 will automatically invoke the EPS fallback procedure to fallback to a LTE base station (e_UTRAN or eNB 230) without first executing multiple signaling steps to try to connect to the IMS network 205 via the 5G NR 12. As discussed below, this immediate trigger to perform the EPS fallback procedure can be achieved by enhancing logic in UE 14_1 (for example, based on the 5G support indicator module 150) such that when communication is initiated at UE 14_1, instead of immediately sending a SIP INVITE from UE 14_1 to the IMS network 205 (via the 5G NR 12), UE 14_1 will automatically trigger the EPS fallback procedure to fallback to LTE by performing reselection to available LTE cell sites (for example, eNB 230). Once UE 14_1 is latched on to an LTE cell site (eNB 230), UE 14_1 will send a SIP INVITE to the connected LTE cell site 230 and re-establish IMS registration using the LTE cell site 230 and Evolved Packet Core (EPC) 215 (existing VoLTE call flow).

Figure 3:
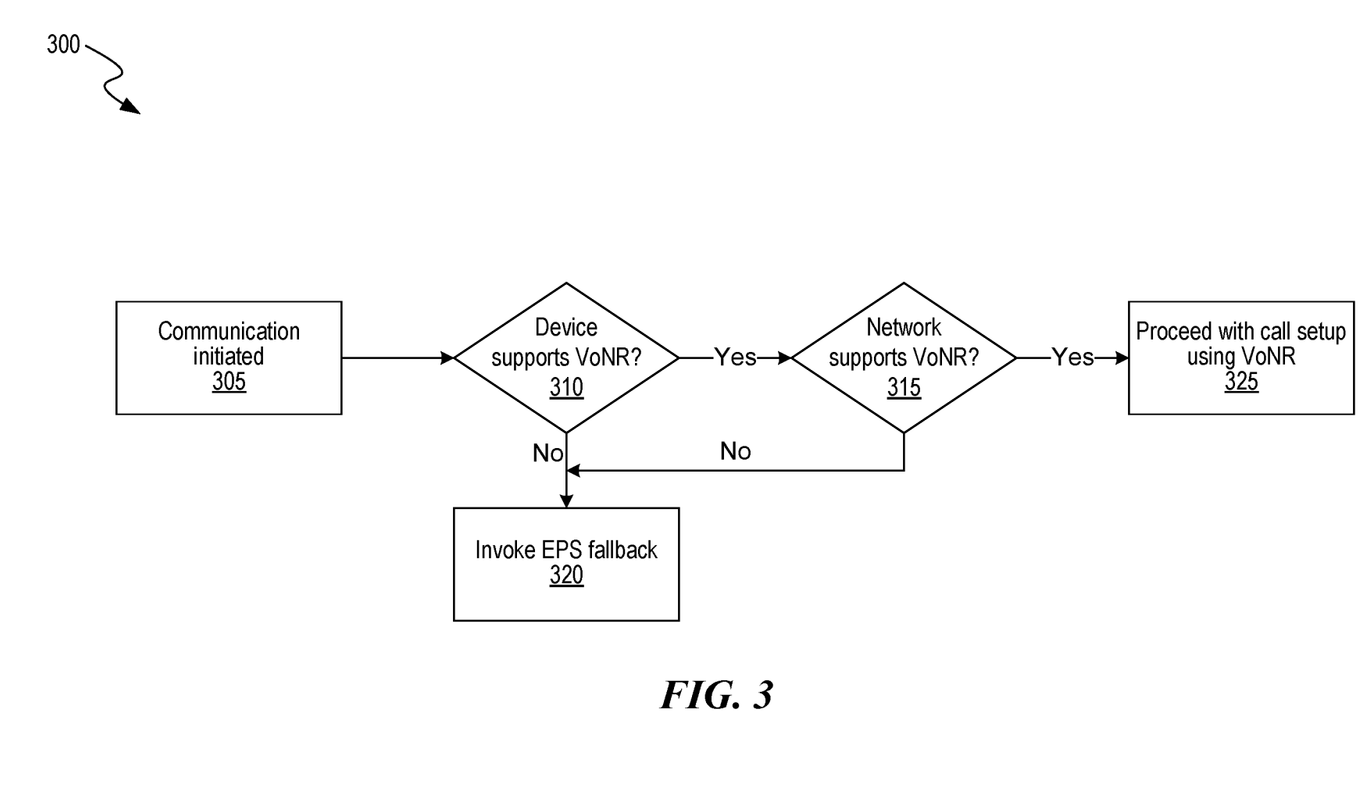
FIG. 3 is a flow diagram illustrating a set of operations for initiating EPS fallback according to various implementations.

FIG. 3 is a flow diagram illustrating a set of operations 300 performed by a UE for immediately initiating the EPS fallback procedure according to various implementations. At block 305, the UE detects whether communication is initiated. For example, communication can be initiated at the UE when a user dials a call and the UE attempts to establish a voice connection. Upon detecting that communication is initiated, at block 310 the UE determines whether the UE itself supports communication over the 5G system. For example, when a user dials an emergency number, the UE evaluates information stored in its 5G support indicator module to determine whether it supports emergency VoNR. When the UE itself supports communication over the 5G system, the UE then evaluates at block 315 whether the connected telecommunications network (for example, connected base station) supports communication over the 5G system. For example, when the user dials the emergency number, the UE evaluates information stored in its 5G support indicator module to determine whether the connected base station currently supports emergency VoNR. In some embodiments, the UE stores information about which communication protocols are currently supported by a connected base station (and the timeframe for such support) during registration (for example, when the UE sends a SIP REGISTER message to the connected base station). The UE can evaluate one or more of the following factors to determine whether the UE and/or the connected base station supports voice communication over 5G: OEM of the UE, attributes of the UE, OEM of the base station, attributes of the base station, current location of the UE, location history of the UE, subscriber plan of a subscriber of the UE, profile of the subscriber of the UE, type of communication initiated at block 305, health of the connected base station, health of the telecommunications network, congestion in the telecommunications network, SIM associated with the UE, and so on. For example, the UE can evaluate one or more information elements of a NAS message (e.g., IMS voice over PS session over 3GPP access indicator field under 5GS Network Feature Support information element) to evaluate whether a connected telecommunications network support communication over 5G New Radio.

When both the UE and the connected network/base station support communication over the 5G system, at block 325, the UE proceeds with establishing such communication (for example, setting up a call using VoNR). When the UE determines that either the UE itself or the connected network/base station does not support communication over the 5G system, at block 320, the UE invokes the EPS fallback procedure (discussed in detail below with reference to FIGS. 4A-4B).

Figure 4A:
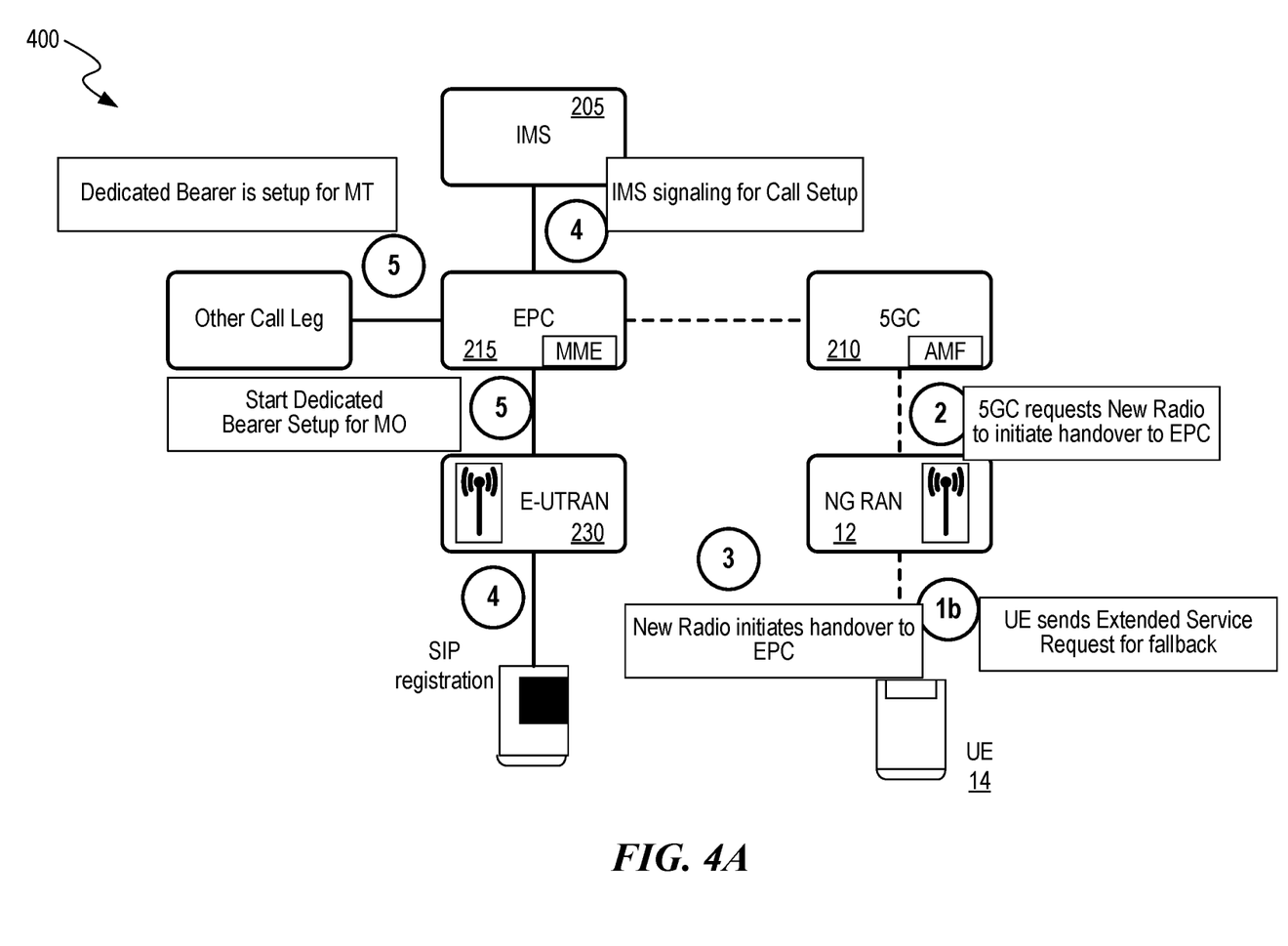
FIGS. 4A-4B are flow diagrams illustrating a set of operations for performing EPS fallback according to various implementations.
Figure 4B:
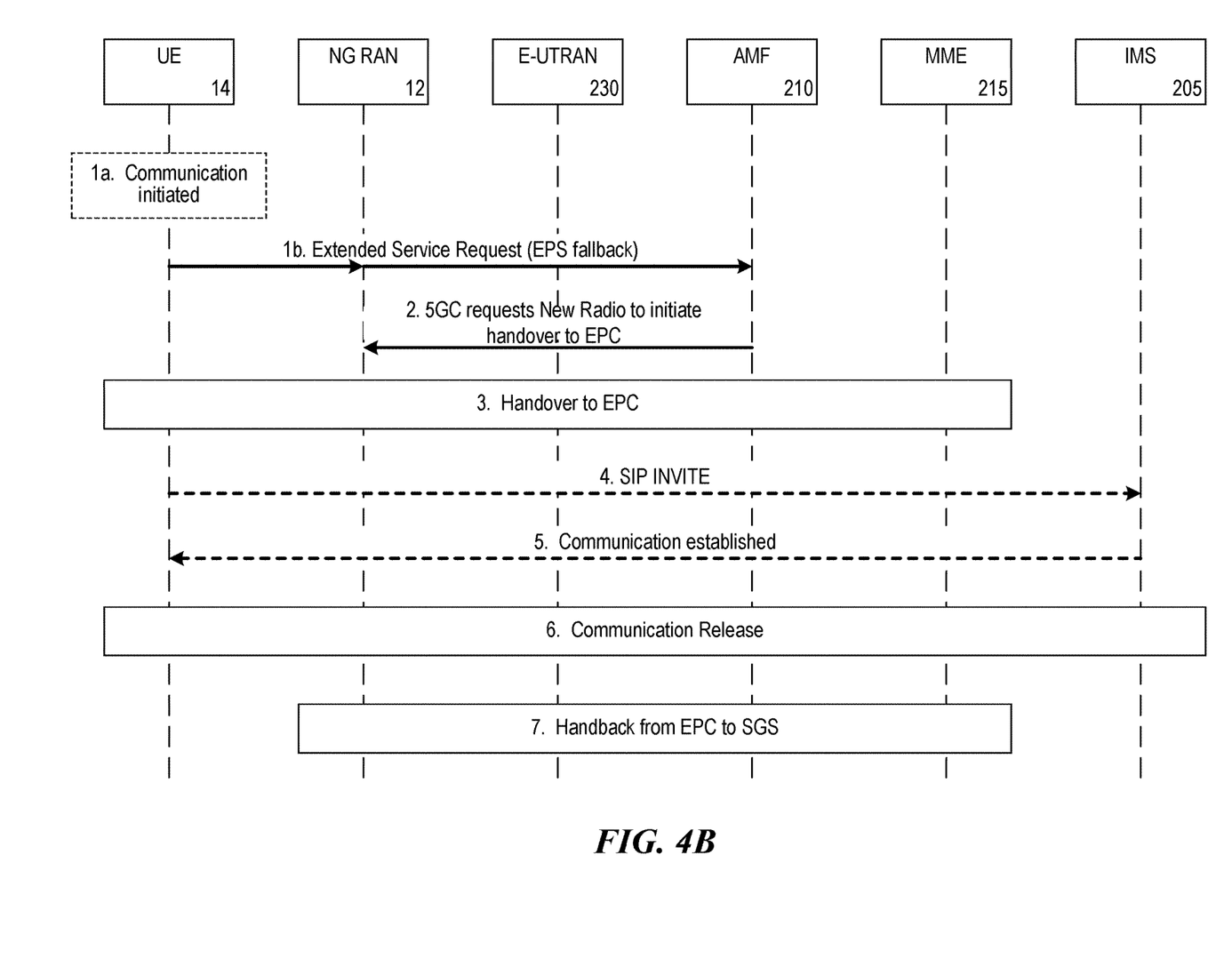

FIGS. 4A-4B are flow diagrams illustrating a set of operations 400 for performing the EPS fallback procedure according to various implementations. Once communication is initiated by UE 14 at operation 1(*a*) and UE 14 determines that either communication over the 5G system is not fully supported (for example, either UE 12 or NG RAN BS 12 does not support VoNR), at operation 1(*b*) UE 14 sends a service request for EPS fallback to the connected NG RAN BS 12. UE 14 can send the EPS fallback extended service request to NG RAN BS 12 via, for example, a 5G Non-Access Stratum (NAS) message (for example, 5G NAS Service Request) indicating that it requires EPS fallback for the communication. For example, UE 14 sends an extended service request to AMF 210 to allow the 5G core network to know that UE 14 wants to start a voice call using fall back to non-5G Radio. NG RAN BS 12 then forwards the EPS fallback service request to the 5G system (5G Core) 210 (for example, to an AMF node within the 5G Core). Upon receiving the EPS fallback service request, in operation 2 the 5G Core 210 requests NG RAN BS 12 to initiate handover to EPC 215. For example, the 5G system 210 triggers a handover towards EPC 215 by executing an N2-AP procedure in which it indicates to NG RAN BS 12 that this is a handover for EPS fallback (for example, via communication between NG RAN BS 12 and AMF in the 5G system 210). In operation 3, NG RAN BS 12 initiates handover of the communication to EPC and a 5G system to EPC handover is executed. In some embodiments, NG RAN 12 sends a command to UE 14 to perform handover (or RRC release with redirection/reselection) to E-UTRAN 230 at a particular frequency band. For example, a source base station (NG RAN 12) sends a "Hand over Command" message to UE 14 once target base station (E-UTRAN 230) accepts the handover (for example, acknowledges the handover request) in preparation phase. The handover command can be an execution phase message that is triggered by a voice call setup command wherein a fall back to 4G Radio is required due to absences of Voice over New Radio (i.e. 5G) support. A frequency band can be selected based on the available bandwidth (frequency licensing), specific frequencies coverage and propagation characteristic, and so on. For example, based on one or more of the above factors, a network operator advises a UE to prioritize bands to be camped on. In several embodiments, when there is only 1 frequency available as sensed by the UE at a particular geography, then this automatically means that there is no need to go through particular band selection as there is only one frequency.

In operation 4, UE 14 sends a SIP INVITE to E-UTRAN (or eNB) 230, which is forwarded to appropriate nodes in EPC 215 and IMS 205. In some embodiments, SIP signaling is exchanged in parallel to the handover procedure. In operation 5, the UE initiated communication is established in the EPC 215. For example, in operation 5, E-UTRAN 230 starts a dedicated bearer setup for the call by communicating with an MME in the EPC 215. While the call is in progress, E-UTRAN 230 is configured to not trigger any handback to the 5G system 210. In operation 6, the call is released using SIP signaling, and the corresponding EPC bearer for voice media is released. In operation 7, when the call is over in EPC 215, E-UTRAN 230 triggers a handback to the 5G system 210. For example, the trigger for handback is the absence of a radio access bearer associated with QCI=1 or with an explicit indication. It will be evident to those skilled in the art that the above-described process is similarly applicable to incoming communication (for example, a mobile termination communication).

Figure 6:
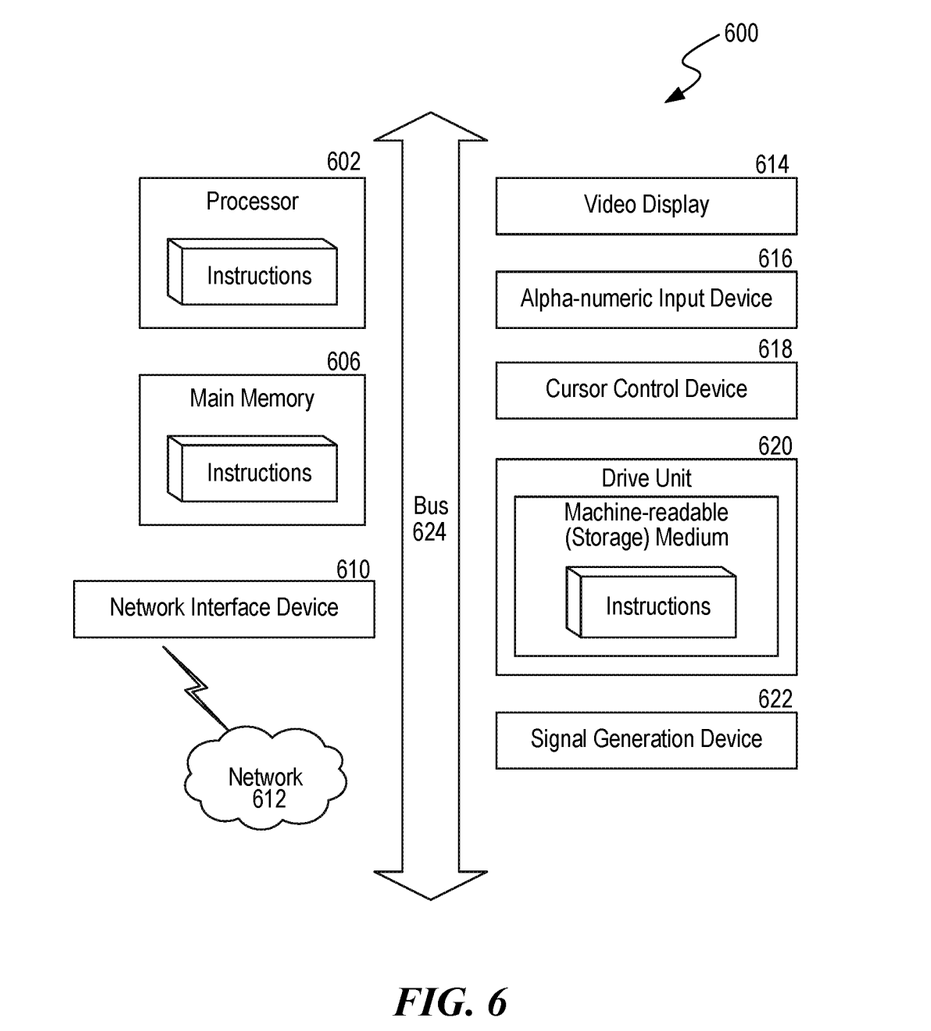
FIG. 6 is a diagrammatic representation of a machine in the example form of a computer system within which a set of instructions, for causing the machine to perform any one or more of the methodologies discussed herein, can be executed.

FIG. 6 is a diagrammatic representation of a machine in the example form of a computer system or machine 600 within which a set of instructions, when executed, can cause the machine to perform any one or more of the processes (for example, process 300) described above. In some embodiments, the machine 600 operates as a standalone device, while in other embodiments, the machine 600 can be connected (for example, networked) to other machines. In a networked deployment, the machine may operate in the capacity of a server or a client user machine in a client-server network environment, or as a peer machine in a peer-to-peer (or distributed) network environment. The machine may comprise a user device, such as UEs 14_1, . . . , 14_N discussed above. In general, the machine 600 includes any electronic devices that provide voice, video and data communication. In some implementations, the machine 600 includes LTE servers (e.g. MME, AMF), and SIP servers or proxies (for example, S-CSCF, I-CSCF, P-CSCF, E-CSCF, BGCF/MGCF, IBCF, and the like). While a single machine is illustrated, the machine 600 can include any collection of machines that individually or jointly execute instructions to perform any of the methods described above.

The machine 600 may include a processor 602, a main memory 606 and a bus 624. The bus 624 is a subsystem for transferring data between the components of the machine 600, including transferring data between the main memory 606 and the processor 602. The bus 624 represents one or more separate physical buses, point to point connections, or both, connected by appropriate bridges, adapters, or controllers. The machine 600 can also include a display device 614, one or more input devices 616, a cursor control device 618 (for example, a mouse), a drive unit 620, a signal generation device or output device 622 (for example, a speaker, a remote control, etc.) and a network interface device 610, among others.

The processor(s) 602 controls the overall operation of the machine 600. The processor(s) 602 executes computer programs or firmware stored in memory (for example, 606, 620). The processor(s) 602 can include one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 606 represents any form of memory ("RAM"), read-only memory ("ROM"), flash memory, or the like, or a combination of such devices connected to the bus 624. The drive unit 620 can include a machine-readable medium or machine-readable storage medium (such as computer-readable media 126) that stores, encodes or carries one or more sets of instructions for execution by the machine 600 to perform any or all of the methods described above. It should be noted that the term "machine-readable medium" and "machine-readable storage medium" can include a single medium or multiple media (for example, a centralized or distributed database, and/or associated caches and servers) that store the one or more sets of instructions embodying any or all of the methods described above.

In general, the routines executed to implement the embodiments of the disclosure can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 610 allows the machine 600 to mediate data in various networks with one or more entities that are external to the machine, through any known and/or convenient communications standards and protocols supported by the machine 600 and the external entities. Example protocols supported by the machine 600 include, but are not limited to: IP protocols for the application layer, transport layer protocols, Internet layer protocols, link layer protocols, LTE protocols, 3G/4G/5G protocols, etc. The network interface device 610 can include one or more of a network adaptor card, a wireless network interface card, a router, an access point, a wireless router, a switch, a multi-layer switch, a protocol converter, a gateway, a bridge, a bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that can supersede the current state of the art.

Systems and method for performing Evolved Packet System (EPS) fallback from a 5G system to a Evolved Packet Core (EPC) system are disclosed. Before attempting to establish communication using the new 5G system, the mobile device is programmed (e.g., by an original equipment manufacturer (OEM) or a telecommunications service provider) to first determine whether both the mobile device and a connected base station support communication over new radio (e.g., VoNR). The mobile device maintains information about whether the device itself supports VoNR, and whether a connected base station (e.g., NG RAN) supports VoNR—this information is determined by the mobile device during the registration process before the device initiates communication. When either the mobile device or the connected base station does not support VoNR, the mobile immediately invokes/triggers the EPS fallback procedure, without first trying to (and eventually failing to) establish 5G communication via the connected base station.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. At least one computer-readable medium, excluding transitory signals and carrying instructions, which when executed in a base station, cause the base station to perform a method, the method comprising:
receiving an Evolved Packet System (EPS) fallback service request from a mobile device to the base station,
wherein the mobile device is associated with a 5G support indicator,
wherein the 5G support indicator includes information about whether the mobile device, or both the mobile device and the base station, support communication over 5G New Radio,
wherein the mobile device determines, based at least in part on the 5G support indicator, whether the mobile device supports communication over 5G New Radio,
wherein the mobile device determines, based at least in part on the 5G support indicator, whether the base station supports communication over new radio,
wherein the EPS fallback service request is generated by the mobile device directly in response to determining that either the mobile device or the base station does not support communication over new radio,
wherein the EPS fallback service request instructs the base station to initiate a fallback procedure from the 5G system to an Evolved Packet Core (EPC) system, and
wherein, when the mobile device initiates a communication, instead of immediately sending a SIP INVITE message to the base station, the mobile device automatically causes the EPC system to connect to an available 3G or 4G base station, based on the EPS fallback service request.

2. The computer-readable medium of claim 1, wherein the EPS fallback service request comprises information of at least one frequency band to be used to perform the fallback procedure from the 5G system to the EPC system.

3. The computer-readable medium of claim 1 further comprising:
transmitting at least one protocol indicator to the mobile device,
wherein the protocol indicator informs the mobile device of a communication protocol supported by the base station, and
wherein the at least one protocol indicator associated with the base station is further associated with a timeframe during which the at least one protocol indicator is valid.

4. A mobile device for performing Evolved Packet System (EPS) fallback from a 5G system to an Evolved Packet Core (EPC) system, the mobile device comprising:
a communication interface configured to communicate with and connect to at least one base station; and
a memory storing computer executable instructions of:
determining, based at least in part on a 5G support indicator module of the mobile device, whether the mobile device supports voice communication over new radio (VoNR);
determining, based at least in part on the 5G support indicator module, whether a connected base station supports voice communication over new radio (VoNR);
in response to determining that either one of the mobile device or the connected base station does not support voice communication over new radio (VoNR):
transmitting an EPS fallback service request from the mobile device to the connected base station,
wherein the EPS fallback service request instructs the connected base station to initiate a fallback procedure from the 5G system to the EPC system, and
wherein the fallback procedure is initiated, based on the 5G support indicator module, to reduce setup time for a call initiated by the mobile device.

5. The mobile device of claim 4 wherein the memory further stores computer executable instructions of:
receiving at least one protocol indicator from the connected base station, wherein the protocol indicator informs the mobile device of a communication protocol supported by the connected base station; and
storing the at least one protocol indicator associated with the connected base station at the mobile device, and wherein the at least one protocol indicator associated with the base station is further associated with a timeframe during which the at least one protocol indicator is valid.

6. The mobile device of claim 4 wherein the memory further stores computer executable instructions of:
receiving at least one protocol indicator from the base station, wherein the protocol indicator informs the mobile device of a communication protocol supported by the base station; and
storing the at least one protocol indicator associated with the connected base station at the mobile device.

7. The mobile device of claim 4 wherein determining whether the mobile device supports voice communication over new radio (VoNR) and determining whether the connected base station supports voice communication over new radio (VoNR) is based at least in part on:
manufacturer of the mobile device,
manufacturer of the connected base station,
attributes of the mobile device,
attributes of the connected base station,
current location of the mobile device,
location of the connected base station,
location history of the mobile device,
subscriber plan of a subscriber of the mobile device,
profile of the subscriber of the mobile device,
type of communication initiated by the mobile device,
health of the connected base station,
health of a telecommunications network in which the connected base station resides,
congestion in the telecommunications network,
SIM associated with the mobile device,
or any combination thereof.

8. The mobile device of claim 4 wherein the EPS fallback service request is a Non-Access Stratum message.

9. The mobile device of claim 4 wherein the EPS fallback service request is transmitted to an access and management mobility function node in a telecommunications network in which the connected base station resides, and comprises information of at least one frequency band to be used to perform the fallback procedure from the 5G system to the EPC system.

10. The mobile device of claim 4 whereby, when the mobile device initiates communications, instead of immediately sending a SIP INVITE message to the at least one base station, the mobile device automatically triggers the EPS fallback service request to fall back to the EPC system by performing reselection to an available LTE base station.

11. The mobile device of claim 4:
wherein the 5G support indicator module includes at least one protocol indicator that contains information about a communication protocol supported by one of the mobile device, the connected base station, or a telecommunications network associated with the connected base station; and
wherein the at least one protocol indicator is associated with at least one timeframe during which the at least one protocol indicator is valid.

12. At least one computer-readable medium, excluding transitory signals and containing instructions, that when executed by a processor, performs a method, the method comprising:
determining, based at least in part on 5G indicator data of a mobile device, whether the mobile device supports a communication over 5G new radio;
determining, based at least in part on the 5G indicator data, whether a base station supports the communication over 5G new radio;
in response to determining that either the mobile device or the base station does not support the communication over 5G new radio:
transmitting an Evolved Packet System (EPS) fallback service request from the mobile device to the base station,
wherein the EPS fallback service request instructs the base station to initiate a fallback procedure from a 5G system to an Evolved Packet Core (EPC) system, and
when the mobile device detects the communication, instead of immediately sending a SIP INVITE message to the base station, the mobile device automatically causes the EPC system to connect to an available 3G or 4G base station, based on the EPS fallback service request.

13. The computer-readable medium of claim 12, wherein the communication is detected when the mobile device initiates a mobile originated (MO) call or when the mobile device receives an Internet Protocol (IP) Multimedia Subsystem (IMS) message indicating a mobile terminated (MT) call.

14. The computer-readable medium of claim 12, wherein the base station is a new radio (NR) node or an evolved universal terrestrial radio access node (E-UTRAN), and wherein the 5G indicator data is stored in a memory of the mobile device.

15. The computer-readable medium of claim 12, wherein the method further comprises:
receiving at least one protocol indicator from the base station, wherein the protocol indicator informs the mobile device of a communication protocol supported by the base station; and
storing the at least one protocol indicator associated with the base station at the mobile device, wherein the at least one protocol indicator associated with the base station is further associated with a timeframe during which the at least one protocol indicator is valid.

16. The computer-readable medium of claim 12, wherein the method further comprises:
receiving at least one protocol indicator from the base station, wherein the protocol indicator informs the mobile device of a communication protocol supported by the base station; and
storing the at least one protocol indicator associated with the base station at the mobile device.

17. The computer-readable medium of claim 12, wherein determining whether the mobile device supports the communication over new radio and determining whether the base station supports the communication over 5G new radio is based at least in part on:
manufacturer of the mobile device,
manufacturer of the base station,
attributes of the mobile device,
attributes of the base station,
current location of the mobile device,
location of the base station,
location history of the mobile device,
subscriber plan of a subscriber of the mobile device,
profile of the subscriber of the mobile device,
a type of the communication,
health of the base station,
health of a telecommunications network in which the base station resides,
congestion in the telecommunications network,
SIM associated with the mobile device,
or any combination thereof.

18. The computer-readable medium of claim 12, wherein the communication is of a type:
non-emergency voice call,
emergency voice call,
non-emergency text message,
emergency text message,
video,
or any combination thereof.

19. The computer-readable medium of claim 12, wherein the EPS fallback service request is a Non-Access Stratum message, and wherein the 5G indicator data includes information about whether the mobile device supports communication over 5G new radio.

20. The computer-readable medium of claim 12, wherein the EPS fallback service request is transmitted to an access and management mobility function node in a telecommunications network in which the base station resides, and comprises information of at least one frequency band to be used to perform the fallback procedure from the 5G system to the EPC system, and wherein the fallback procedure is triggered, based on the 5G indicator data, to reduce setup time for the mobile device in response to the detecting of the communication.

* * * * *